United States Patent
Nocchi et al.

(10) Patent No.: US 11,789,419 B2
(45) Date of Patent: Oct. 17, 2023

(54) ADAPTIVE AUTOMATIC FILLING SYSTEMS FOR BEVERAGE DISPENSERS

(71) Applicant: Marmon Foodservice Technologies, Inc., Osseo, MN (US)

(72) Inventors: Jeremy Nocchi, Cary, IL (US); John Skowron, Lindenhurst, IL (US); Clayton Knight, South Elgin, IL (US); Muhammad Ahmed Naveed, Valparaiso, IN (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 525 days.

(21) Appl. No.: 17/019,614

(22) Filed: Sep. 14, 2020

(65) Prior Publication Data

US 2021/0078848 A1    Mar. 18, 2021

Related U.S. Application Data (60) Provisional application No. 62/901,371, filed on Sep. 17, 2019.

(51) Int. Cl.
*B67D 1/08* (2006.01)
*G05B 19/042* (2006.01)
(Continued)

(52) U.S. Cl.
CPC ......... *G05B 19/042* (2013.01); *B67D 1/0888* (2013.01); *G06V 10/44* (2022.01); *G06V 10/764* (2022.01); *G06V 10/774* (2022.01); *G06V 20/52* (2022.01); *B67D 2001/1259* (2013.01); *G05B 2219/2645* (2013.01); *H04N 7/18* (2013.01)

(58) Field of Classification Search
CPC .......... B67D 1/0888; B67D 2001/1259; G06K 9/6202; G05B 19/042; G05B 2219/2645; G06V 10/764; G06V 10/774; G06V 10/44; G06V 20/52; H04N 7/18
See application file for complete search history.

(56) References Cited

U.S. PATENT DOCUMENTS

| | | | |
|---|---|---|---|
| 2,144,835 | A | 1/1938 | Dickinson |
| 2,239,395 | A | 4/1941 | Mallory |

(Continued)

FOREIGN PATENT DOCUMENTS

| | | |
|---|---|---|
| CN | 105264312 B | 6/2018 |
| EP | 1647951 A1 | 4/2006 |

(Continued)

OTHER PUBLICATIONS

International Search Report and Written Opinion, PCT/US2016/036832, dated Nov. 15, 2016.

*Primary Examiner* — Michael Collins
(74) *Attorney, Agent, or Firm* — Andrus Intellectual Property Law, LLP (57) ABSTRACT

A system for dispensing a beverage into a cup. Dispensing hardware is configured to dispense the beverage into the cup. A vision system captures an image of the cup within a dispensing area of the system. A model contains data corresponding to the cup being full. A control system compares the image of the cup to the model and controls the dispensing hardware to dispense the beverage into the cup based on the comparison of the image of the cup to the model.

19 Claims, 5 Drawing Sheets

(51) Int. Cl.
    *G06K 9/62*        (2022.01)
    *G06V 10/764*      (2022.01)
    *G06V 10/774*      (2022.01)
    *G06V 10/44*       (2022.01)
    *G06V 20/52*       (2022.01)
    *H04N 7/18*        (2006.01)
    *B67D 1/12*        (2006.01)

(56) References Cited

U.S. PATENT DOCUMENTS

| | | | |
|---|---|---|---|
| 2,609,915 A | 9/1952 | De Burgh | |
| 2,824,638 A | 2/1958 | De Burgh | |
| 3,364,959 A | 1/1968 | Herman et al. | |
| 4,195,751 A | 4/1980 | Smith | |
| 4,202,387 A | 5/1980 | Upton | |
| 4,236,553 A | 12/1980 | Reichenberger | |
| 4,437,499 A | 3/1984 | Devale | |
| 4,469,150 A | 9/1984 | Grimaldi | |
| 4,559,979 A * | 12/1985 | Koblasz | G01F 23/2962 141/11 |
| 4,590,975 A | 5/1986 | Credle, Jr. | |
| 4,728,005 A | 3/1988 | Jacobs et al. | |
| 4,949,526 A | 8/1990 | Brogna et al. | |
| 5,000,345 A | 3/1991 | Brogna et al. | |
| 5,036,892 A | 8/1991 | Stembridge | |
| 5,129,548 A | 7/1992 | Wisniewski | |
| 5,343,716 A | 9/1994 | Swanson et al. | |
| 5,350,082 A | 9/1994 | Kiriakides, Jr. et al. | |
| 5,390,714 A | 2/1995 | North, III et al. | |
| 5,491,333 A | 2/1996 | Skell et al. | |
| 5,607,083 A | 3/1997 | Vogel et al. | |
| 5,868,311 A | 2/1999 | Cretu-Petra | |
| 6,053,359 A | 4/2000 | Goulet et al. | |
| 6,058,986 A | 5/2000 | Bethuy et al. | |
| 6,102,246 A | 8/2000 | Goulet et al. | |
| 6,354,468 B1 | 3/2002 | Riek | |
| 6,394,153 B2 | 5/2002 | Skell et al. | |
| 6,450,369 B1 | 9/2002 | Heyes | |
| 6,648,185 B1 | 11/2003 | Henry et al. | |
| 6,688,134 B2 | 2/2004 | Barton et al. | |
| 6,705,356 B2 | 3/2004 | Barton et al. | |
| 6,789,585 B1 | 9/2004 | Janke | |
| 7,269,960 B2 | 9/2007 | Elsom et al. | |
| 7,597,187 B2 | 10/2009 | Bausenwein et al. | |
| 7,614,524 B2 | 11/2009 | Girard et al. | |
| 7,637,205 B2 | 12/2009 | Greiwe et al. | |
| 7,673,661 B2 | 3/2010 | Chase et al. | |
| RE41,760 E | 9/2010 | Thompson et al. | |
| 8,297,471 B2 | 10/2012 | Dooley et al. | |
| 8,490,540 B2 | 7/2013 | Webster et al. | |
| 8,505,593 B1 | 8/2013 | Denise | |
| 8,565,916 B2 | 10/2013 | Zhang et al. | |
| 8,616,366 B2 | 12/2013 | Ishino et al. | |
| 8,695,646 B2 | 4/2014 | Agam | |
| 8,739,840 B2 | 6/2014 | Mattos, Jr. et al. | |
| 8,757,222 B2 | 6/2014 | Rudick et al. | |
| 8,770,446 B2 | 7/2014 | Sevcik et al. | |
| 8,893,926 B2 | 11/2014 | Anderson et al. | |
| 8,950,254 B2 | 2/2015 | Bernhardsgruetter et al. | |
| 9,010,577 B2 | 4/2015 | Hoover | |
| 9,017,485 B2 | 4/2015 | Murthy et al. | |
| 9,045,323 B2 | 6/2015 | Crane et al. | |
| 9,067,775 B2 | 6/2015 | Mattos, Jr. et al. | |
| 9,141,562 B2 | 9/2015 | Pickett et al. | |
| 9,150,366 B2 | 10/2015 | Rudick et al. | |
| 9,417,003 B2 | 8/2016 | Baack | |
| 9,477,317 B1 | 10/2016 | Clements | |
| 9,796,575 B2 * | 10/2017 | Deng | A47J 31/4482 |
| 9,840,407 B2 | 12/2017 | Difatta et al. | |
| 10,053,354 B2 | 8/2018 | Rosenlund et al. | |
| 10,178,928 B2 | 1/2019 | Ophardt et al. | |
| 10,235,865 B2 | 3/2019 | Thyroff | |
| 10,258,191 B2 | 4/2019 | Apone et al. | |
| 10,269,082 B2 | 4/2019 | Morris et al. | |
| 10,362,896 B2 | 7/2019 | Apone et al. | |
| 10,571,041 B2 | 3/2020 | Bischel | |
| 10,820,743 B2 * | 11/2020 | Schnyder | B67D 1/0888 |
| 11,117,793 B1 | 9/2021 | Khan | |
| 2003/0155031 A1 | 8/2003 | Barton et al. | |
| 2008/0164274 A1 | 7/2008 | Stettes | |
| 2008/0282897 A1 | 11/2008 | Webster et al. | |
| 2009/0178728 A1 | 7/2009 | Cochran et al. | |
| 2009/0308494 A1 | 12/2009 | Linn | |
| 2012/0295358 A1 | 11/2012 | Ariff et al. | |
| 2013/0074980 A1 | 3/2013 | Crane et al. | |
| 2013/0075426 A1 | 3/2013 | Crane et al. | |
| 2013/0220480 A1 | 8/2013 | Angus et al. | |
| 2014/0041748 A1 | 2/2014 | Angus et al. | |
| 2014/0224375 A1 | 8/2014 | Willis | |
| 2015/0298956 A1 | 10/2015 | Rudick et al. | |
| 2016/0081365 A1 | 3/2016 | Bertone | |
| 2016/0207753 A1 | 7/2016 | Choi et al. | |
| 2017/0079468 A1 | 3/2017 | Apone et al. | |
| 2017/0079469 A1 | 3/2017 | Apone et al. | |
| 2017/0135519 A1 * | 5/2017 | Deng | A47J 31/4457 |
| 2018/0201492 A1 | 7/2018 | Jung et al. | |
| 2018/0327243 A1 | 11/2018 | Rider et al. | |
| 2019/0062137 A1 * | 2/2019 | Schick | B67D 1/1247 |
| 2019/0208952 A1 | 7/2019 | Schnyder | |
| 2019/0223654 A1 | 7/2019 | Apone et al. | |
| 2020/0000274 A1 | 1/2020 | Apone et al. | |
| 2020/0055720 A1 | 2/2020 | Volftsun et al. | |
| 2020/0095110 A1 * | 3/2020 | Pohl | A47J 31/525 |
| 2020/0122994 A1 * | 4/2020 | Cimatti | B67D 1/0034 |
| 2021/0022547 A1 * | 1/2021 | Stork genannt Wersborg | A47J 31/56 |

FOREIGN PATENT DOCUMENTS

| | | |
|---|---|---|
| EP | 2449929 A1 | 5/2012 |
| EP | 3172970 A1 | 5/2017 |
| EP | 3275348 A1 | 1/2018 |
| EP | 3670436 A1 | 6/2020 |
| GB | 2509521 | 7/2014 |
| WO | 2019/180252 | 9/2019 |

\* cited by examiner

ADAPTIVE AUTOMATIC FILLING SYSTEMS FOR BEVERAGE DISPENSERS

CROSS REFERENCE TO RELATED APPLICATIONS

This application claims the benefit of U.S. Provisional Patent Application No. 62/901,371 filed Sep. 17, 2019, which is incorporated herein by reference in its entirety.

FIELD

The present disclosure generally relates to adaptive auto-filling systems for beverage dispensers, and more particularly to beverage dispensing systems incorporating vision systems for automatically filling a cup based on comparison to a model.

BACKGROUND

The following U.S. patents provide background information and are incorporated by reference in entirety.

U.S. Pat. No. 4,236,553 discloses an electronic controller for solenoid valve actuated beverage dispensers which allows the operator to automatically dispense properly filled cups of various sizes. A slideably mounted electronic probe is lifted by the lip of the cup positioned under the dispenser spout. Actuation of a switch energizes the solenoid valves starting the dispensing cycle. When the cup is filled to the level of the probe, the solenoid valves are de-energized. Early de-energization of the solenoid valves by bubbles is avoided by adjusting a time delay-off knob so that the proper level will be attained for each class of beverage. Too much or too little ice in the glass will not affect the level. Digital counters record the number of drinks served by size or price.

U.S. Pat. No. 4,728,005 discloses a beverage dispensing machine, and particularly an automatic self-fill control apparatus for the machine for controlling the filling of the liquid tank. The liquid tank is fed with a combination of water and a concentrate syrup adapted to be mixed with the water within the tank. A sensor member is disposed in the tank in a position so as to be responsive to the rise and fall of liquid in the tank. Pump means are provided and adapted to pump the syrup to the tank. Control of water flow to the tank is also carried out. The sensor member has a low probe for detecting a low predetermined level of liquid in the tank and a high probe for detecting a high predetermined level of liquid in the tank and adapted to respectively generate low and high probe signals. A control circuit means is provided receiving and responsive to these low and high probe signals for controlling the pump to operate when the low probe is uncovered, and terminating the pumping action when the liquid level reaches the high probe position, so that the liquid level in the tank is always maintained at a level between the low and high probes. Also provided is a third sensor for determining an unsafe condition referred to herein as a system override to shut the system down in the event that the high probe is covered and that the liquid level proceeds to the even higher third probe. Also in the system of the present invention, there is provided a sensor for detecting an out-of-syrup condition.

U.S. Pat. No. 6,058,986 discloses an electronic control for an automatic filling beverage dispensing valve. The dispensing valve includes a valve body, a flow control mechanism and a solenoid. The valve further includes an electrically conductive cup actuated lever for operating a micro-switch that is operatively connected to the electronic control of the present invention. The valve body includes a nozzle and a stainless steel electrical contact for providing electrical connection between the electronic control and the beverage as it flows through the nozzle into a cup. The electronic control of the present invention is microprocessor controlled and includes an internal signal generator which generates a signal independent of the input line frequency supplying the power to the control. This generated signal is buffered and applied to the dispensing cup lever while simultaneously being applied to a reference input of a phase-locked loop detector circuit. When beverage fills a cup to the rim thereof the beverage can flow over the rim and thereby provide an electrical continuity between the electrically conductive lever and the stainless steel contact within the nozzle. Thus, a signal is conducted to an input of the phase locked-loop detector circuit where that electrical signal is compared to the generated reference signal. If the two signals are matched in both frequency and phase, the detector circuit generates a continuity detected signal to the micro-processor. The microprocessor thereby ends dispensing by de-energizing the solenoid.

SUMMARY

This Summary is provided to introduce a selection of concepts that are further described below in the Detailed Description. This Summary is not intended to identify key or essential features of the potentially claimed subject matter, nor is it intended to be used as an aid in limiting the scope of the potentially claimed subject matter.

One embodiment of the present disclosure generally relates to a system for dispensing a beverage into a cup. Dispensing hardware is configured to dispense the beverage into the cup. A vision system captures an image of the cup within a dispensing area of the system. A model contains data corresponding to the cup being full. A control system compares the image of the cup to the model and controls the dispensing hardware to dispense the beverage into the cup based on the comparison of the image of the cup to the model.

Another embodiment generally relates to a method for dispensing a beverage into a cup. The method includes monitoring a dispensing area to detect whether a cup is present therein, and capturing with a vision system, when the cup is detected within the dispensing area, an image of the object within the vision system. The method further includes comparing the image of the cup to a model having data corresponding to the cup being full to determine whether the cup is full. The method further includes dispensing, when the cup is detected in the dispensing area, the beverage into the cup until the comparison of the image to the model determines that the cup is full.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

In an effort to automate the process of filling a cup with a beverage, systems have been developed for detecting the fill level of a beverage and automatically stopping the dispense process at the appropriate time. For example, U.S. Pat. No. 6,058,986 discloses a system in which electrical continuity is formed between an electrically conductive lever and a conductive contact within a dispensing nozzle when a beverage fills to a sufficient level to provide a connection therebetween. Other exemplary systems are also disclosed in U.S. Pat. Nos. 4,236,553 and 4,728,005, all of which are incorporated herein by reference in their entireties.

The present inventors have identified shortcomings in the systems presently known in the art, and further identified benefits to an automatic system in which the dispensing is controlled volumetrically through the use of a vision system. As will become apparent, the presently disclosed systems and methods further utilize a vision system to incorporate machine learning into the process, whereby different sizes and configurations of cups may be used with the dispensing system, and whereby machine-learned models can then be used to adaptively and automatically fill these various types of cups. This provides flexibility for use of the machine across different types of users and over a broader range of time, including changes in cup configurations (e.g., sizes and shapes). Additionally, the presently disclosed system improves sanitation by no longer requiring contact between the beverage being dispensed and physical (for example, electric) sensor for determining the fill level of the beverage within a cup. Likewise, sanitation is improved over systems that rely upon buttons, levers, and/or touch screens to cause the system to dispense.

Additionally, the present inventors have identified that by using the presently disclosed systems and methods, a dispensing operation may take into account transient filling states, such as a temporary build-up of foam, froth, and/or fizz. This allows the system to pause filling, then continue upon resolution of the transient filling state until a desired fill level is achieved.

Figure 1:
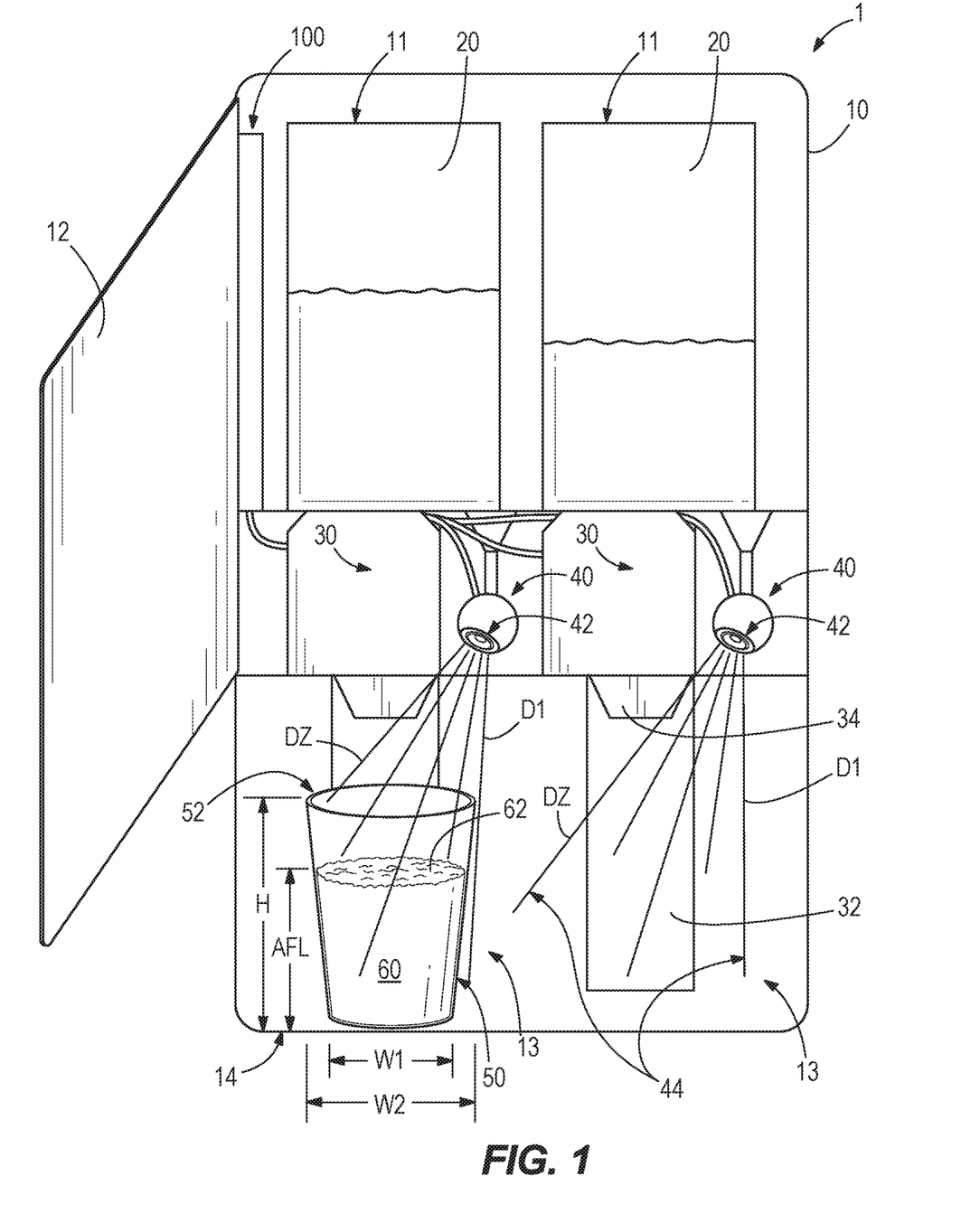
FIG. 1 depicts an exemplary system for automatically filling a beverage according to the present disclosure.

FIG. 1 discloses an exemplary system 1 according to the present disclosure. The system 1 includes a cabinet 10 having one or more locations 11 for installing containers 20 that hold the beverage to be dispensed, or constituents thereof. For example, the containers may contain a concentrate that is mixed with a gasified liquid (such as carbonated or nitrogenized water) as the base to together form the desired beverage. Complete beverages and constituent parts are all referred to herein as simply beverages. In certain embodiments, the cabinet 10 has a door 12 for concealing the containers 20 during normal operation. Also behind the door 12 are various components together classified as dispensing hardware 30, which as presently known in the art may include various pumps and valves for dispensing the beverage from the container 20 into a cup 50 positioned within a dispensing area 13 of the system 1, particularly via a spout 34. In the embodiment shown, an actuator 32, shown here as a lever, is also provided for manually filling the cup 50. In certain embodiments, the actuator 32 may function in a conventional manner to operate outside of the vision system to be discussed below. For example, this may allow a user to fill a cup 50 to a lesser than typical volume, or to flush the system with no cup 50 present. The actuator 32 may also work in conjunction with the vision system disclosed herein, for example to prevent accidental or mischievous overfilling. Other embodiments may omit the actuator 32 altogether such that the entire system operates by the vision system.

In the embodiment of FIG. 1, a separate vision system 40 is further provided for each set of dispensing hardware 30, which in the present example includes a camera 42 having a field of view 44. The camera 42 is exemplarily a digital camera that captures images in the visible or IR light spectrums, for example. The camera 42 may include a wide-angle lens that increases the field of view 44 relative to the distance that the camera 42 is positioned from the cup 50 and/or the dispensing area 13. An exemplary camera 42 presently available in the market is the Himax HM01B0 camera; though others known in the art may also or alternatively be used. As will be discussed further below, the vison system 40 is configured to take measurements of distances D1-DZ between the camera 42 and objects across the field of view 44, as well as to capture images of the cup 50 and/or the beverage 60 dispensed therein. Additional features may also be detected by the vision system 40, which may have a wider or narrower field of view 44 than that shown.

A model 90 containing data corresponding to different examples allowable cups, filled cups, and transient conditions is stored within a memory system 130 to be discussed further below (see FIG. 2). In certain embodiments, a series of images are created from the camera 42 as raw data. These images are then tagged and sent as a training dataset into a "learning algorithm." In an exemplary embodiment, the tags indicate whether the image contains an allowable cup, a cup that is full, or a cup with a transient condition inside (as well as other states). This learning algorithm takes the inputted, tagged images, analyzes them, and generates or outputs one or more models 90 to be used for future image analysis with images captured by the camera 42. In this manner, the model 90 is then used for subsequent image analysis to determine if an object is present, if that object is a cup (e.g., is allowable), if the cup is full, and if there are any transient conditions present (e.g., within the cup), for example. This model 90 is then installed into the valve assembly or elsewhere within the system 1. In certain embodiments, the learning module uses a lattice sense offline machine learning FPGA, for example trained using TensorFlow developed by the Google Brain Team, along with the Lattice Diamond compiler by Lattice Semiconductor™. My incorporating offline machine learning, a given system 1 may function without the need for network connectivity to a cloud or other devices such that the model 90 is independent.

Figure 5:
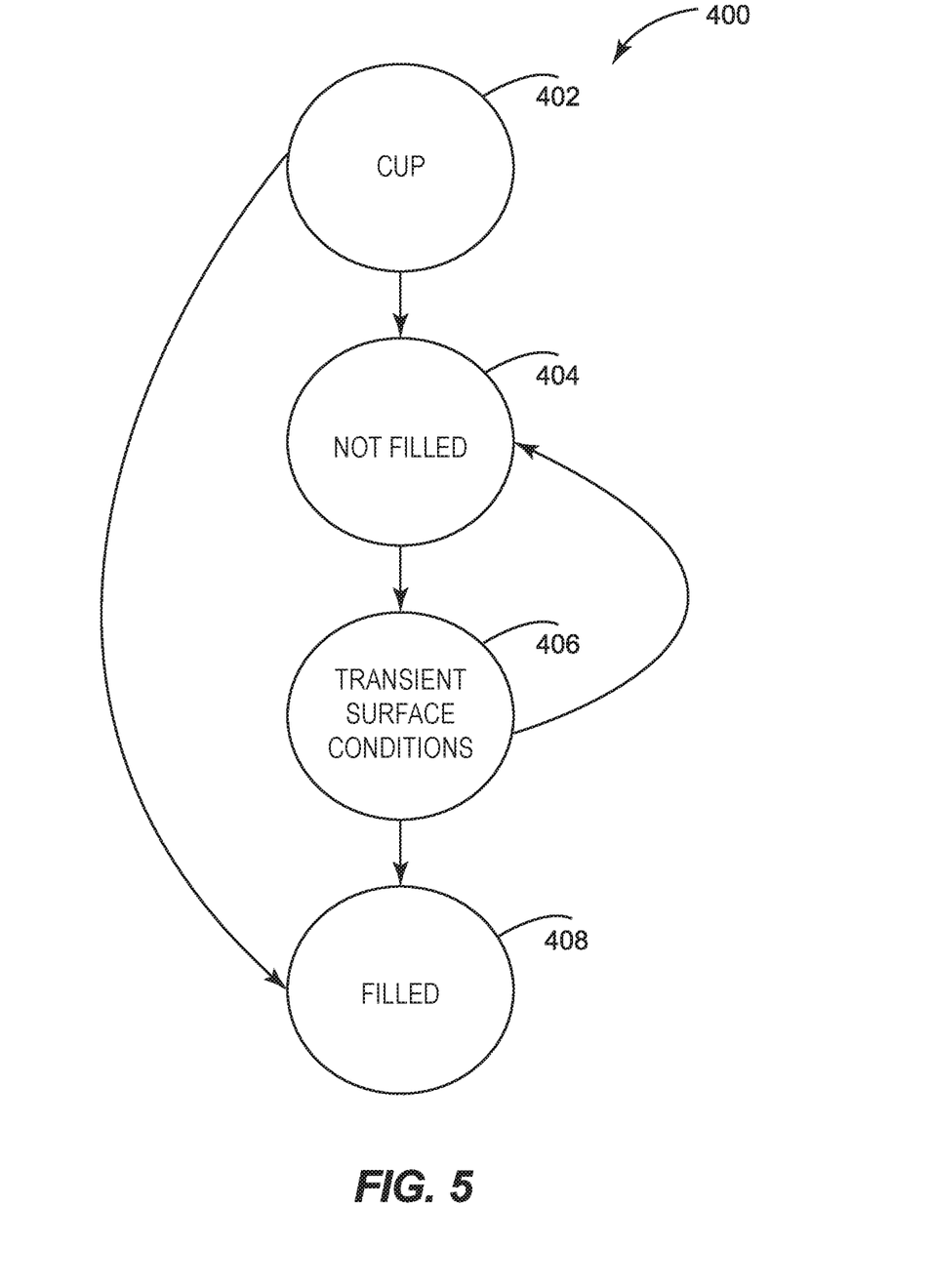
FIG. 5 is a state diagram for automatically filling a beverage according to the present disclosure.

The groups of examples previously listed may also be considered "states". As exemplified in the state diagram 400 of FIG. 5, a first state 402 represents the identification of an allowable cup (and in certain examples, the identification of which specific allowable cup), the second state 404 represents the identification that the cup is not filled, the third state 406 represents the identification that the cup has a transient surface condition associated therewith, and the forth state 408 represents the identification that the cup is filled. Other data may also be contained within the model 90 (trained by entering tagged images as discussed above, for example), such as non-allowable cups, other objects to not dispense into (e.g., hands or cleaning cloths), and/or the like. The process thus proceeds through the different states of FIG. 5 until a cup identified as being allowed is ultimately determined to be filled, which is discussed further below.

In this manner, the model 90 may in certain embodiments be divided into sub-models each catering one or more of the state groupings listed above. Further sub-models within these state groupings may also exist in certain embodiments. For example, the identification of an allowable cup, and specifically which cup (e.g., a 20 oz cup with a wide top), may result in different application of the sub-model to a filled cup (e.g., specific to filled 20 oz cups with wide tops). However, the structure within the model 90 may be combined or divided as described above, such as to apply the same portion of the model 90 relating to a filled cup state for any cup having the same width of top, for example. In other words, the appearance of a filled cup may be the same for a 12 oz cup and a 24 oz cup that only vary in height, each having the same distance from the top of the beverage to the lip of the cup relative to the width of the cup, for example.

The control system 100 then causes the dispensing hardware 30 to dispense the beverage 60 into the cup 50 based on a comparison of the image taken by the vision system 40 relative those incorporated within the model 90. In certain embodiments, the model 90 includes information regarding the height H, widths W1 and W2, and edges 52 of a series of allowable cups. In this manner, when a cup 50 is identified to match an allowable cup within the model 90, information regarding the size and volume of that cup 50 may then also be identified. Within the model 90, each allowable cup may further include corresponding information relating to a desired fill level DFL for dispensing the beverage 60 into the cup 50, which can then be compared to an actual fill level AFL already present within the cup 50.

In certain embodiments, determinations of the desired fill level DFL and/or actual fill level AFL may be provided or confirmed through the use of additional sensors, such as time of flight (TOF) sensors as known in the art.

In other examples, the desired fill level DFL and actual fill level AFL do not constitute actual distance measurements (e.g., from the vision system 40), but instead are relationships relative to the edge 52 of the cup 50 or other landmarks as would be visible within the images taken by the vision system 40. The desired fill level DFL may be learned from images designated as corresponding to full cups, whereby the actual fill level AFL of a cup 50 either does or does not equal the desired fill level DFL (at which point dispensing would be stopped, as discussed further below). Ultimately, the desired fill level DFL will be identified as having a particular appearance for a given cup 50, which can then be compared through image analysis to the beverage contained within a cup 50 at any given point in time to determine whether that cup 50 is full. As stated above, this desired fill level DFL may vary by the specific configuration of the cup 50, and/or by the specific beverage being filled. Accordingly, the model 90 may vary by beverage as well, whereby a hot beverage may have a lower desired fill level DFL than a cold beverage within the same sized cup 50, for example, to prevent burning the consumer.

In addition to training the model 90 by providing images of cups 50 that are allowable, and cups that are full, images of cups 50 that are not full may also be inputted and tagged to be learned and incorporated into the model 90. As will be discussed below, similar alternatives are available to train the model 90 of other states, such as a cup 50 containing foam, or objects that are not allowable cups 50 to fill (e.g., a hand within the field of view 44 that is cleaning the camera 42).

The images collected by the vision system 40 may then further be analyzed to detect the presence of transient surface conditions 62, such as foam, froth, and/or fizz, for example. This may be determined on the basis of many different characteristics, including texture, smoothness, and/or variations in height across a given area, color relative to a color of the beverage 60 as detected or compared to a pre-set value, and/or the like. In certain embodiments, this is determined by waiting a predetermined delay time (e.g., between 1 and 5 seconds) and repeating the imaging process and analysis to determine if any changes have occurred. For example, the transient surface conditions themselves may be identified as having resolved (e.g., no longer identified within the images as compared to the model 90), and/or the model 90 may now indicate that the cup 50 is not (or is no longer) determined to be full. In other words, a cup 50 may be identified as full while transient surface conditions are present, but no longer be full once the transient conditions resolve, requiring further filling until the model 90 indicates that the cup 50 is full.

In certain embodiments, this allows the control system 100 to automatically stop the dispensing process when the comparison of the images taken by the vision system 40 with the model 90 indicate that the cup 50 is full, which in certain embodiments is specific to the given cup 50 identified within the model 90. As discussed below, the control system 100 may further be configured to pause the dispensing process when a transient surface condition 62 has been detected and remains unresolved. In certain embodiments, this is determined by waiting a predetermined delay time (e.g., between 1 and 5 seconds) and repeating the imaging process and analysis to determine if any changes have occurred. By incorporating the adaptive learning processes discussed herein, the system is able to learn new widths W1 and W2 and heights H as new cups or containers are introduced over time. Additional details regarding the process for filling a cup 50 through the present system 1 are discussed below. Once the actual fill level AFL is determined to be at the desired fill level DFL, and that this actual fill level AFL corresponds to the desired beverage rather than a temporary phenomenon, the fill process may be automatically terminated and the cup 50 identified as being ready for the consumer.

Figure 2:
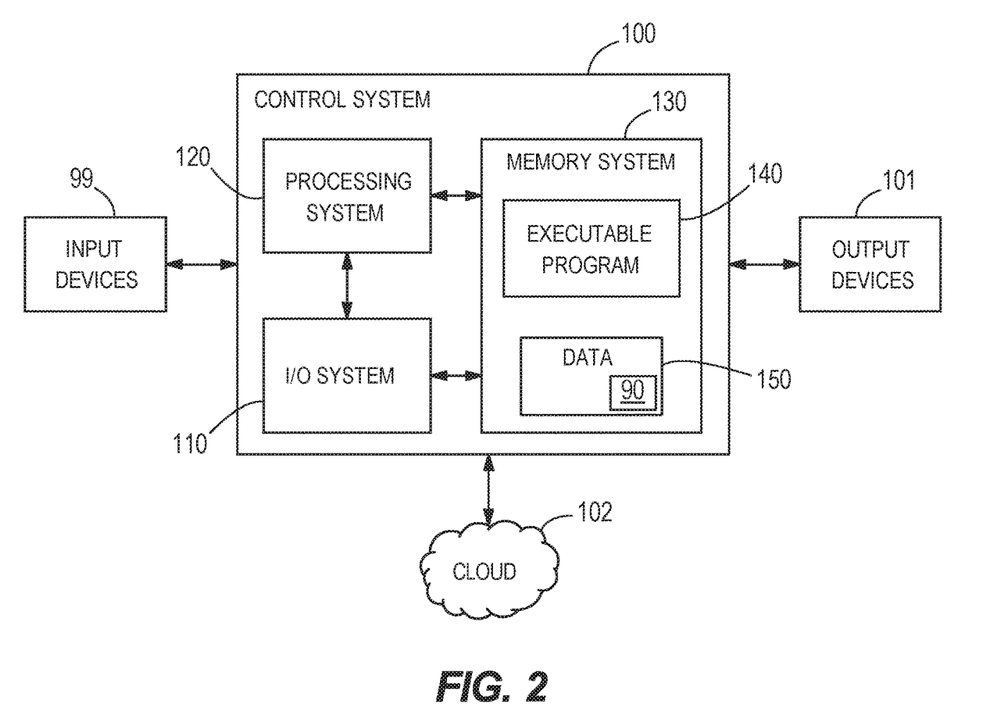
FIG. 2 is a schematic view of an exemplary control system such as that shown incorporated into the system of FIG. 1.

FIG. 2 depicts an exemplary control system 100 for operating the system 1 of FIG. 1. Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

The control system 100 may be a computing system that includes a processing system 120, memory system 130, and input/output (I/O) system 110 for communicating with other devices, such as input devices 99 (e.g., a camera device) and output devices 101 (such as the dispensing hardware 30 of FIG. 1). The control system 100 in certain embodiments further communicates with a cloud 102, providing that one or more components may be located remotely from the cabinet 10, and/or that multiple systems 1 may be interconnected within a network, for example. The processing system 120 loads and executes an executable program 140 from the memory system 130, accesses data 150 stored within the memory system 130, and directs the system 1 to operate as described in further detail below.

The processing system 120 may be implemented as a single microprocessor or other circuitry, or be distributed across multiple processing devices or sub-systems that cooperate to execute the executable program 140 from the memory system 130. Non-limiting examples of the processing system include general purpose central processing units, application specific processors, and logic devices. In an exemplary embodiment, images are run through the Lattice Sense and TensorFlow programs, which leverage connected graphical processing units to build the comparative analysis. The graphical processing units can range in power and scope, whereby an increase in memory and processing power will help decrease the amount of time required to build the comparative algorithm.

The memory system 130 may comprise any storage media readable by the processing system 120 and capable of storing the executable program 140 of computer readable code executable by the processing system 120, and which upon execution, carries out the functions of the method 200 described herein. The memory system 130 also stores data 150, such as the model 90 discussed above. The memory system 130 may be implemented as a single storage device, or be distributed across multiple storage devices or sub-systems that cooperate to store computer readable instructions, data structures, program modules, or other data. The memory system 130 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

Figure 3:
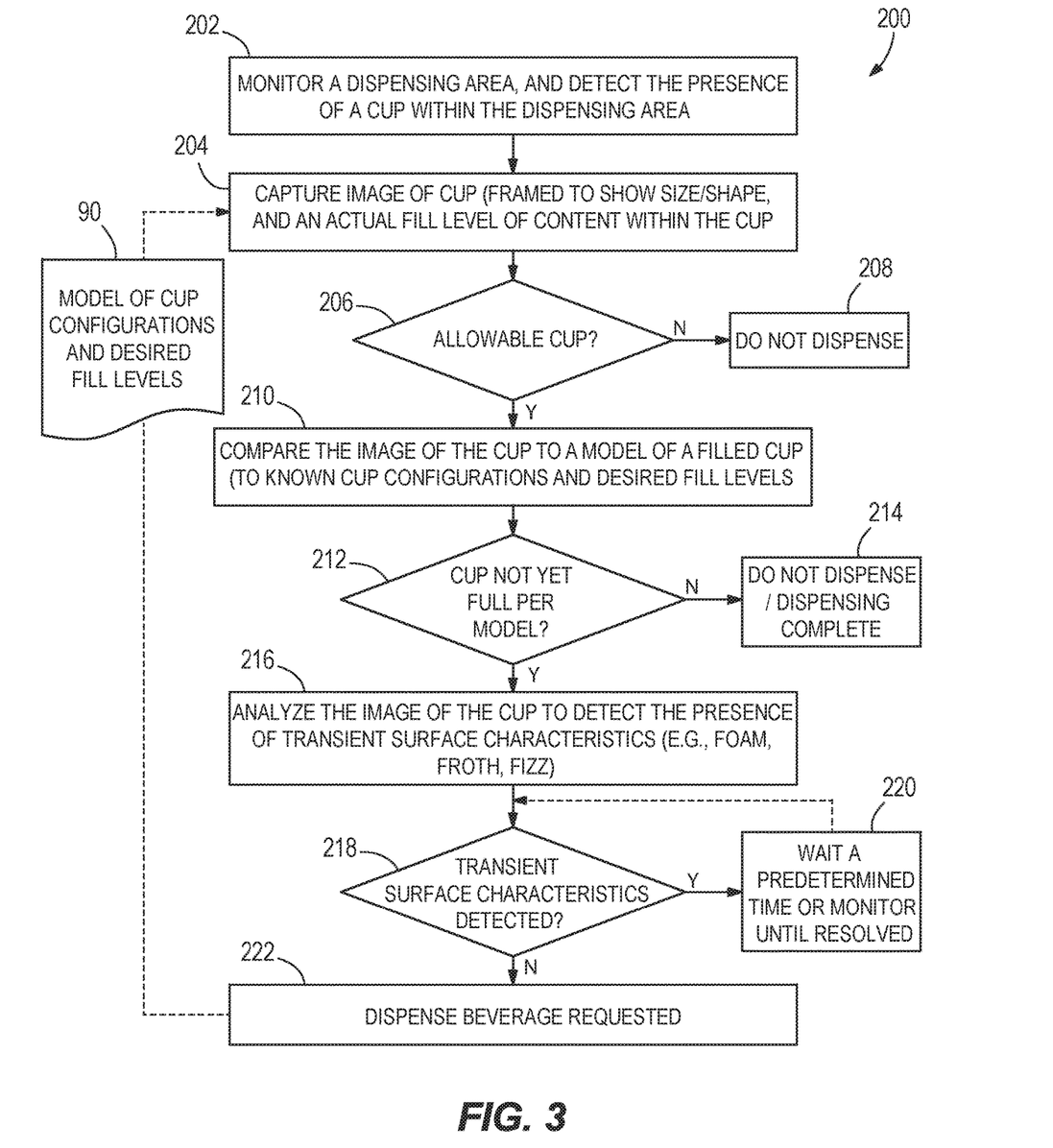
FIG. 3 is an exemplary method for automatically filling a cup using the system shown in FIG. 1.

FIG. 3 depicts an exemplary process flow 200 for filling a cup 50 using the system 1 presently disclosed. The process flow 200 begins with the vision system 40 monitoring the dispensing area 13 to detect the presence of a cup 50 positioned therein as step 202, such as that presently shown in the left dispensing area 13 in FIG. 1. From there, the vision system 40 captures an image of the cup 50, which may include the size, shape, and other physical characteristics of the cup 50, as well as an actual fill level AFL content, such as the beverage 60, within the cup 50.

In certain embodiments, the vision system 40 may also monitor for images that correspond to objects that are known to not be cups 50, providing an express safeguard to avoid dispensing. In other words, instead of not dispensing unless the vision system 40 identifies a cup 50, if a non-cup is identified, the dispenser is prevented from dispensing. Exemplary non-cup images for comparison include those of hands, wiping cloths, soup or ice cream dishes, food trays, and/or other objects. Some of these items may have similarities to authorized cups 50, such as an ice cream dish, that may otherwise be allowed by certain models 90, but that are not intended to be filled with a beverage. It will be recognized that if other, non-cups are positively identified by the vision system 40, additional actions may be taken beyond preventing dispensing. For example, if a hand or cleaning cloth is identified within the field of view 44, the system 1 may automatically initiate a cleaning cycle, prevent manual dispensing operations, and/or the like.

The control system 100 then determines whether the cup 50 is allowable in step 206. This may be based on the cup 50 being an appropriate size or shape as determined through analysis of the images captured by the vision system 40, and/or may consider whether the cup 50 is of the right type for the beverage 60 requested to be dispensed (such as being a cup for cold beverages versus hot beverages). If the cup 50 is not determined to be allowable in step 206, the system 1 will not dispense the requested beverage 60 (Step 208).

In certain embodiments, the model 90 includes desired fill levels DFL corresponding to a wide variety of cup 50 configurations, including such characteristics as small, medium, large, and child sized cups, hot or cold beverage cups, and/or the like. In further embodiments, the vision system 40 may further be configured to prevent dispensing of an incorrect beverage for a given cup 50. For example, the system 1 may be prevented from dispensing a hot beverage 60 if it is determined that the cup 50 in place to be filled corresponds to a cold cup 50, which might melt the plastic, for example, or lead to otherwise undesirable product or consequences. In such an example, an operator may be warned through a message provided by the system 1, which may include text, sounds, and/or other indicators.

If the cup 50 is allowable in step 206, the control system 100 then compares in step 210 the image of the cup 50 taken from step 204 to a model 90 with data corresponding to one or more filled cups 50, which may be stored as data 150 within the memory system 130 as stated above. The model 90 may further be adaptive through dynamic learning such that new configurations of cup 50 may be supported (filled) by the system 1 based on historic, learned rules (i.e., identifying an edge 52 of the cup 50 shown in FIG. 1). In other words, through machine learning or artificial intelligence, the system 1 may learn that images of cups 50 designated as being allowable, and/or being "full" have common characteristics, such as an edge 52, a certain look or distance between the edge and the actual fill level AFL, different color characteristics for the edge 52 versus beverages, and/or the like. These additional leanings then enable the system 1 to work with a new type of cup 50 that was not previously used in training. For example, a new cup 50 having similar dimensions to a previously trained variety can be accommodated by the model 90 based on the same principles of identifying the edge 52 relative to the beverage within the cup 50, for example. This also permits different colors, opacities, materials, shapes, and/or the like of cups 50 to be used over time, without the need for costly and time-consuming field support.

The control system 100 next determines in step 212 whether the cup in the image does not yet match a full cup as provided within the model 90, which as stated above may be specific to the particular cup (e.g., volume) identified earlier by comparison to the model 90. In this example, it is assumed that if the image captured by the vision system 40 matches a full cup within the model 90, no transient surface conditions are present since the tagged images inputted into the model 90 are assumed to have a stable or normal appearance in addition to being full. If the model 90 indicates that the image of the cup does already correspond to a full cup, the system 1 either does not dispense (in the case of starting with an already-full cup 50), or completes the dispensing process in step 214. As discussed above, this may include some type of indication by the system 1 to an operator that dispensing has completed, such as visual or audible indicators. If instead it is determined in step 212 that the cup is not yet full, the system 1 in step 216 analyzes the image of the cup 50 to detect the presence of transient surface characteristics 62 such as foam, froth, and/or fizz, as discussed above. In certain examples, step 212 could further be confirmed using time of flight sensors detecting the actual fill level AFL to compare to a desired fill level DFL for confirmation, as discussed above.

If it is determined in step 218 that transient surface conditions 62 are present, the system in step 220 either waits a predetermined time to continue dispensing, dispenses at a reduced rate until the actual fill level AFL approaches the desired fill level DFL, and/or monitors the status of the transient surface conditions 62 until resolved. In certain embodiments, this is determined by waiting a predetermined delay time (e.g., between 1 and 5 seconds) and repeating the imaging process and analysis to determine if any changes have occurred (e.g., the conditions have resolved). In alternate embodiments, the system 1 continuously monitors and analyzes the images rather than waiting a predetermined delay time, and/or proceeds with the filling process at a reduced rate while the transient surface condition 62 is present, for example. Once no transient surface conditions 62 are detected (or such conditions fall below a predetermined threshold), additional dispensing of beverage is requested of the system 1 in step 222 and the process repeats at step 204.

Figure 4:
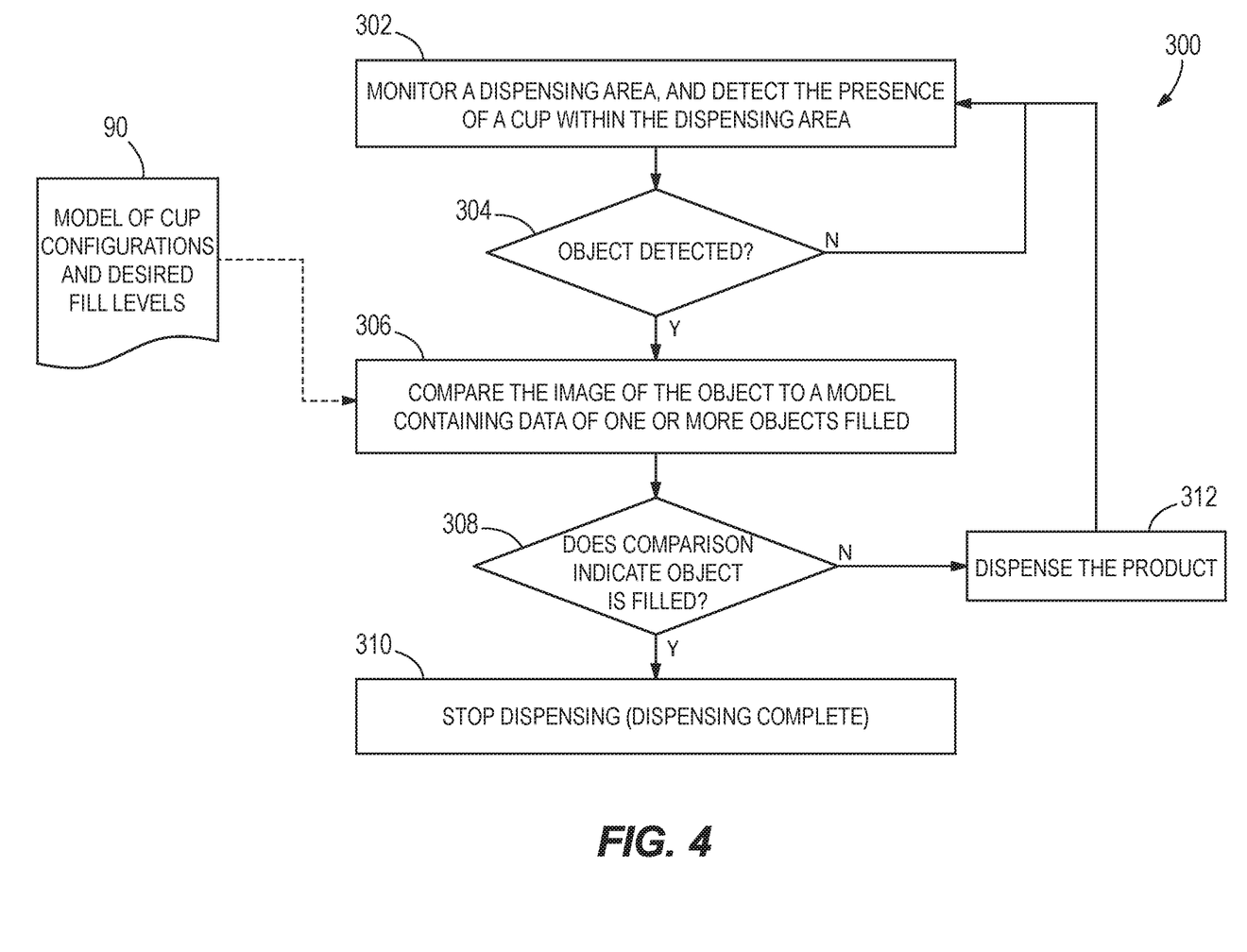
FIG. 4 is another exemplary method for automatically filling a cup using the system.

It will be recognized that some of the steps discussed above, such as confirming that the cup 50 is authorized, and/or whether transient surface conditions are present, need not be included with the process of every system according to the present disclosure, for example. FIG. 4 depicts a simplified process 300 in which the field of view 44 is monitored to detect the presence of an object such as a cup in step 302. This monitoring may be via the vision system 40 discussed above, or other types of sensors, such as time of flight sensors (e.g., IR-based, sonar, and/or the like). If an object is detected in 304, an image of the object is then captured in step 304 by the vision system 40 as discussed above. If no object is detected, the process repeats back at step 302.

The process continues with step 306 after an image is generated of the object, whereby the image is compared to a model containing data for one or more objects (e.g., cup configurations). The data may include objects that are filled cups, cups having transient surface characteristics, cups that are not full, and/or other objects, for example objects that are identified as those that should not be filled (e.g., a hand or wiping cloth). If the comparison in step 306 indicates in step 308 that the object corresponds to an object of the type in the image being full, the process stops at step 310. If instead the image comparison indicates that the object is not yet full, product is dispensed (or continues to dispense) at step 312 and the process repeats.

It will be recognized that the machine learning processes described herein can also accommodate for different operational conditions, such as low light, high light, and glare, to name a few.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for dispensing a beverage into a cup, the system comprising:
dispensing hardware configured to dispense the beverage into the cup;
a vision system that captures an image of the cup within a dispensing area of the system;
a model containing data corresponding to the cup being full; and
a control system that compares the image of the cup to the model and controls the dispensing hardware to dispense the beverage into the cup based on the comparison of the image of the cup to the model;
wherein the model further includes data for a transient surface condition, and wherein the control system pauses the dispensing of the beverage when the comparison of the cup to the model identifies the transient surface condition in the cup.

2. The system according to claim 1, wherein the model includes data corresponding to a plurality of cup configurations, and wherein the comparison of the image of the cup by the control system includes determining whether the cup corresponds to one of the plurality of cup configurations from the model.

3. The system according to claim 2, wherein the plurality of cup configurations includes at least two different cup sizes, and wherein the comparison of the image is to data within the model corresponding to which of two different cup sizes is determined for the cup in the image.

4. The system according to claim 1, wherein the model includes a desired fill level for the beverage to be dispensed into the cup, and wherein the comparison of the image of the cup includes determining the beverage within the cup corresponds to the desired fill level from the model.

5. The system according to claim 4, wherein the model of the filled cup includes a plurality of cup configurations, and wherein the desired fill level varies within the plurality of cup configurations.

6. The system according to claim 1, wherein the transient surface condition is at least one of foam, froth, and fizz build-up on the beverage dispensed into the cup.

7. The system according to claim 1, wherein the vision system includes an optical camera.

8. A system for dispensing a beverage into a cup, the system comprising:

dispensing hardware configured to dispense the beverage into the cup;
a vision system that captures an image of the cup within a dispensing area of the system;
a model containing data corresponding to the cup being full; and
a control system that compares the image of the cup to the model and controls the dispensing hardware to dispense the beverage into the cup based on the comparison of the image of the cup to the model;
wherein the dispensing hardware dispenses the beverage into the cup only after the comparison of the image to the model determines that the cup is not full.

9. The system according to claim 8, wherein the control system automatically dispenses the beverage until the comparison of the image to the model indicates that the cup is full.

10. A method for dispensing a beverage into a cup, the method comprising:
monitoring a dispensing area to detect whether a cup is present therein;
capturing with a vision system, when the cup is detected within the dispensing area, an image of the object within the vision system;
comparing the image of the cup to a model having data corresponding to the cup being full to determine whether the cup is full; and
dispensing, when the cup is detected in the dispensing area, the beverage into the cup until the comparison of the image to the model determines that the cup is full.

11. The method according to claim 10, wherein the model further comprises data corresponding to a plurality of cup configurations, and wherein the comparison of the image to the model includes determining whether the cup corresponds to one of the plurality of cup configurations from the model.

12. The method according to claim 11, further comprising identifying a volume of the cup based on the comparison of the image of the cup to the model, wherein dispensing is based at least in part on the volume identified for the cup.

13. The method according to claim 10, wherein the model includes a desired fill level for the beverage to be dispensed into the cup, and wherein the comparison of the image of the cup includes determining whether an actual fill level within the cup is less than the desired fill level from the model.

14. The method according to claim 13, wherein the model of the filled cup includes a plurality of cup configurations, and wherein the desired fill level varies within the plurality of cup configurations.

15. The method according to claim 10, wherein the beverage is automatically dispensed into the cup until the comparison of the image to the model indicates that the cup is full.

16. The method according to claim 10, wherein the dispensing further includes receiving an input from a user to dispense the beverage.

17. The method according to claim 10, wherein the model further includes data for a transient surface condition, further comprising pausing the dispensing when the comparison of the cup to the model indicates the transient surface condition in the cup.

18. The method according to claim 17, wherein the transient surface condition is at least one of foam, froth, and fizz build-up on the beverage dispensed into the cup.

19. The method according to claim 10, wherein the model further comprises data corresponding to a plurality of allowable cups, and further comprising dispensing only when the image of the cup corresponds to one of the plurality of allowable cups.

* * * * *